United States Patent
Kim et al.

(10) Patent No.: US 10,880,119 B2
(45) Date of Patent: Dec. 29, 2020

(54) METHOD FOR REMOVING DATA FRAME REDUNDANCY IN NETWORK ENVIRONMENT, AND DEVICE AND COMPUTER PROGRAM FOR CARRYING OUT SAME

(71) Applicant: KOREA ELECTROTECHNOLOGY RESEARCH INSTITUTE, Changwon (KR)

(72) Inventors: Jae Moon Kim, Suwon (KR); Hui Myoung Oh, Seoul (KR); Sung Soo Choi, Seongnam (KR); Chang Un Park, Suwon (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 16 days.

(21) Appl. No.: 16/338,346

(22) PCT Filed: Dec. 1, 2016

(86) PCT No.: PCT/KR2016/014044
§ 371 (c)(1),
(2) Date: Jun. 19, 2019

(87) PCT Pub. No.: WO2018/062625
PCT Pub. Date: Apr. 5, 2018

(65) Prior Publication Data
US 2020/0028709 A1    Jan. 23, 2020

(30) Foreign Application Priority Data
Sep. 30, 2016 (KR) .................... 10-2016-0126300

(51) Int. Cl.
*H04L 12/437* (2006.01)
*H04L 12/823* (2013.01)
(Continued)

(52) U.S. Cl.
CPC ............ *H04L 12/437* (2013.01); *H04L 47/32* (2013.01); *H04L 47/34* (2013.01); *H04L 49/251* (2013.01)

(58) Field of Classification Search
CPC ............ G06F 12/0261; G06F 12/1018; H04N 19/0006; H04L 43/0829; H04L 12/28; H04L 12/56; H04B 7/14
See application file for complete search history.

(56) References Cited

U.S. PATENT DOCUMENTS 6,356,553 B1    3/2002   Nagami et al.
2010/0220658 A1    9/2010   Taha et al.
(Continued)

FOREIGN PATENT DOCUMENTS

KR    20070074163    7/2007

OTHER PUBLICATIONS

Search Report dated Jun. 20, 2017 for PCT Application No. PCT/KR2016/014044.

*Primary Examiner* — Iqbal Zaidi

(57) ABSTRACT

The present invention relates to a method for removing data frame redundancy in a network environment and a device for carrying out the method, which can comprise: a data frame reception step of receiving a first data frame from an adjacent node; and a redundant frame determination step of determining whether a reception completion indicator of a second data frame having the same identification information as the first data frame exists, on the basis of a preset redundancy check table, and processing the first data frame according to the determination result. Disclosed is the data frame redundancy removal method, which deletes the first data frame when the reception completion indicator of the
(Continued)

second data frame having the same identification information as the first data frame exists in the redundancy check table.

7 Claims, 5 Drawing Sheets

(51) Int. Cl.
*H04L 12/801* (2013.01)
*H04L 12/947* (2013.01)

(56) References Cited

U.S. PATENT DOCUMENTS

| | | |
|---|---|---|
| 2011/0161777 A1 | 6/2011 | Radulescu |
| 2014/0153637 A1* | 6/2014 | Imai ................. H04N 21/23611 |
| | | 375/240.02 |
| 2015/0295635 A1 | 10/2015 | Koskiande et al. |
| 2017/0250782 A1* | 8/2017 | Zahemszky ........... H04L 1/0061 |
| 2018/0373429 A1* | 12/2018 | Yamamoto .............. G06F 3/061 |

* cited by examiner

FIG. 2

REDUNDANCY CHECK TABLE

IDENTIFICATION INFORMATION

| SOURCE ADDRESS | SEQUENCE NUMBER | RECEPTION COMPLETION INDICATOR | RECEPTION STANDBY INDICATOR |

METHOD FOR REMOVING DATA FRAME REDUNDANCY IN NETWORK ENVIRONMENT, AND DEVICE AND COMPUTER PROGRAM FOR CARRYING OUT SAME

CROSS-REFERENCE TO RELATED APPLICATIONS

This application is a U.S. National Stage of PCT/KR2016/014044 filed Dec. 1, 2016, which claims the priority benefit of Korean Patent Application No. 10-2016-0126300 filed on Sep. 30, 2016, in the Korean Intellectual Property Office.

TECHNICAL FIELD

The present invention relates to a method of removing data frame redundancy in a network environment and a device for performing the method, and more particularly, to a method of preventing a redundancy check error by a data frame error, and a device and a computer program performing the method.

BACKGROUND ART

International Electrotechnical Commission (IEC) 62439-3 defines a redundant protocol for establishing a high-available automation network in an industrial communication network. In the standard, contents for a Parallel redundancy protocol (PRP) and High-available Seamless Redundancy (HSR) protocol are defined, and both the two contents define a method of operating a redundant frame.

In order to transmit a frame from a source to a destination in a network configuration, the frame needs to pass through each node between the source and the destination. A method of transmitting a frame to an adjacent node by each node may be generally divided into two methods. The first method is a "store-and-forward" method, in which a received frame is stored inside a node and then the stored frame is transmitted to an adjacent node after the reception is completed. The second method is a "cut-through method" in which a partial region of a front part of a frame (mainly, a destination region of a header part) is received and then is directly and subsequently transmitted to an adjacent node.

Particularly, since a network formed in a ring structure needs to pass through each node when transmitting a frame, a time taken for passing through each node is important. That is, when a time taken for passing through each node is increased, a time from a source to a destination is long, thereby causing deterioration of performance of a network. In the store-and-forward method, a frame may be transmitted to an adjacent node after the frame is completely received, and particularly, as a length of the frame is increased, a delay time is increased. When the cut-through method is used, the problem may be solved.

In the related art, in order to remove a data frame redundantly received in a node, in the case where a data frame having the same source address and the same sequence number is received, the redundancy of the data frame is prevented by a method of removing a data frame received later in time.

However, the method in the related art has problems in that a previous received data frame has an error, a data frame received later is illogically removed even though the data frame received later is a normal data frame, and a corresponding node cannot receive a normal data frame.

DISCLOSURE

Technical Problem

The present invention is conceived to solve the foregoing problems, and an object of the present invention is to provide a method of removing data frame redundancy, which uses a reception completion indicator indicating that reception of a data frame is normally completed, in addition to an identification number of the data frame, in order to prevent a normal data frame from being removed instead of a data frame having an error in a data frame redundancy removal method in a network environment using an IEC 62439-3 HSR protocol, and a device and a computer program for performing the method.

Technical Solution

A method of removing data frame redundancy in a network environment according to the present invention may include: receiving a data frame, in which a first data frame is received from an adjacent node; and determining a redundant frame, in which it is determined whether there exists a reception completion indicator for a second data frame having the same identification information as identification information of the first data frame based on a predetermined redundancy check table, and processing the first data frame according to a result of the determination.

Herein, the determining of the redundant frame may include deleting the first data frame when the reception completion indicator for the second data frame having the same identification information as the identification information of the first data frame exists in the predetermined redundancy check table.

Further, the determining of the redundant frame may include receiving entire data of the first data frame when the reception completion indicator for the second data frame having the same identification information as the identification information of the first data frame does not exist in the predetermined redundancy check table.

Further, the method may include: registering the identification information of the first data frame and a reception standby indicator indicating that the first data frame is being received in the redundancy check table; and when the entire data of the first data frame is completely received, changing the reception standby indicator indicating that the first data frame is being received to a reception completion indicator.

Further, the determining of the redundant frame may include: when the reception completion indicator for the second data frame having the same identification information as the identification information of the first data frame does not exist in the predetermined redundancy check table, but when a reception standby indicator indicating that the data frame is being received exists, temporarily storing the first data frame; and determining whether the reception completion indicator for the second data frame exists after a predetermined time elapses.

Further, the identification information may include a source address and a sequence number.

Further, the method, the data frame may be transferred by a cut-through scheme.

A device for removing data frame redundancy in a network environment according to the present invention may include: a receiving unit configured to receive a data frame from an adjacent node; a memory unit configured to store a redundancy check table including identification information of the received data frame and a reception completion indicator for the corresponding data frame; and a redundant frame determining unit configured to determine whether a reception completion indicator for a data frame having the same identification information as identification information of the received data frame exists based on the redundancy check table, and processing the received data frame according to a result of the determination.

Advantageous Effects

According to the exemplary embodiments of the present invention, it is possible prevent a frame being lost due to an incorrect removal of a redundant frame when a data frame is transferred in a network environment, thereby securing a speed and reliability of the data transmission.

DESCRIPTION OF DRAWINGS

The accompanying drawings included as a part of the detailed description for helping the understanding of the present invention provide an exemplary embodiment of the present invention and describes the technical spirit of the present invention together with the detailed description.

FIG. 2 is a diagram illustrating an example of a redundancy check table and a frame structure for removing frame redundancy according to the present invention.

BEST MODE

The present invention may be variously transformed, and have various exemplary embodiments, so that specific exemplary embodiments will be described in detail with reference to the accompanying drawing hereinafter.

The exemplary embodiment described below is provided for helping general understanding of a method, a device, and/or a system described in the present specification. However, this is simply an example, and the present invention is not limited thereto.

In the description of the present invention, when a detailed description of a related publicly known function or constituent element is determined to unnecessarily make the subject matter of the present invention unclear, the detailed description thereof will be omitted. Terms described below are terms set in consideration of a function in the present invention, and may be changed according to an intention of a user and an operator or a usual practice. Accordingly, the definitions thereof should be made based on the entire contents of the present specification. Terms used in the detailed description is for the purpose of describing the exemplary embodiments of the present invention, and shall not be restrictively used. Unless otherwise mentioned, a singular form includes a plural form. In the present description, the expression, such as "including" or "having", is intended to designate specific characteristics, numbers, steps, operations, elements, and a part or a combination thereof, and shall not be construed so as to exclude existence or a possibility of one or more other characteristics, numbers, steps, operations, and elements, and a part or a combination thereof in addition to the described matters.

Further, terms, such as a first and a second, may be used for describing various constituent elements, but the constituent elements are not limited by the terms. The terms are used only for the purpose of discriminating one constituent element from another constituent element.

Hereinafter, a method of removing data frame redundancy according to the present invention, and a device and a computer program performing the method will be described in detail with reference to the drawings accompanying exemplary embodiments.

Figure 1:
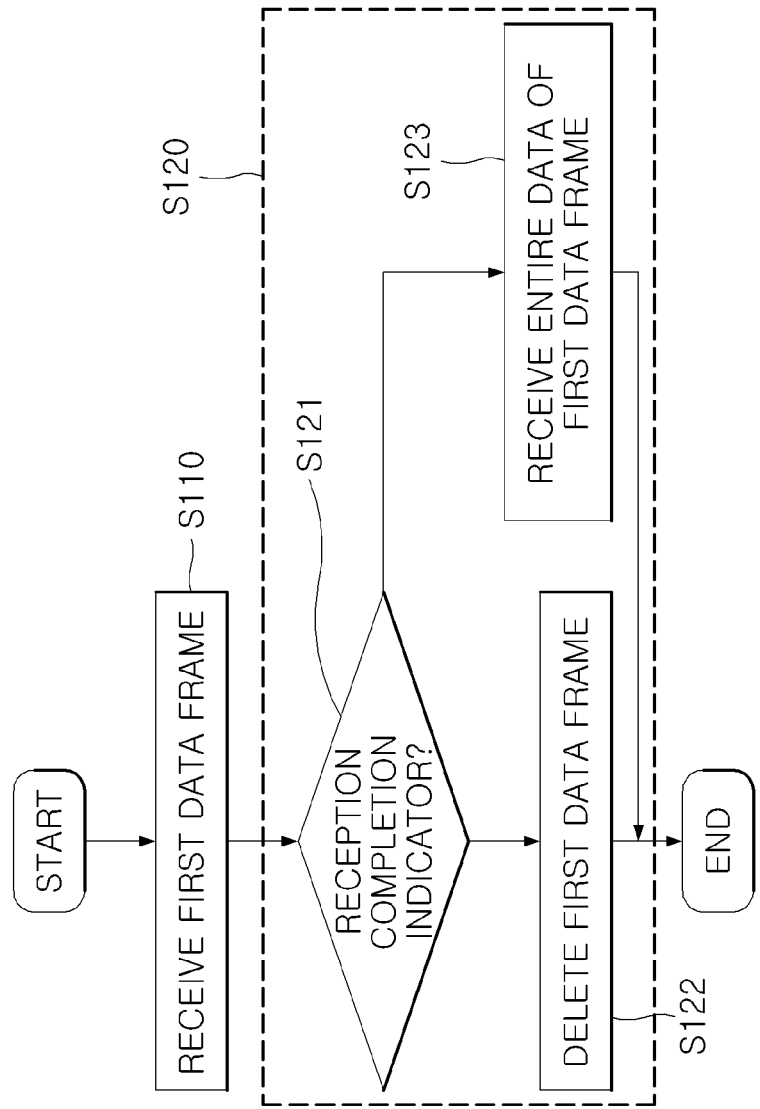
FIG. 1 is a diagram illustrating an order of a method of removing data frame redundancy according to the present invention.

FIG. 1 is a diagram illustrating an order of a method of removing data frame redundancy in a network environment according to the present invention.

Referring to FIG. 1, a method of removing data frame redundancy according to the present invention may generally include receiving a first data frame (S110), and determining a redundant frame (S120).

First, in operation S110, the first data frame may be received from an adjacent node. However, in a data frame transmission scheme of a network, all of the entire data of the first data frame are not received based on a cut-through method, but a partial region, particularly, a header part, from which identification information of the first data may be obtained, is received.

Next, in operation S120, it is determined whether there is a history indicating that a second data frame having the same identification information as that of the received first data frame has been already normally received before the first data frame is received based on a predetermined redundancy check table. The second data frame means any one of the data frames having the same identification information as that of the first data frame, and a reception start time point of the second data frame is earlier than that of the first data frame.

FIG. 2 is a diagram illustrating an example of the redundancy check table and the frame structure for removing frame redundancy according to the present invention. The redundancy check table may include identification information of the data frames received from a corresponding node until now, information about a reception completion indicator and a reception standby indicator, and the like.

Herein, the identification information includes a source address, a sequence number, and the like of the corresponding data frame, and means information for discriminating the corresponding data frame from another data frame. The reception completion indicator indicates that the node normally completely receives entire data of the corresponding data frame, and the reception standby indicator indicates that data included in the current data frame is being received. FIG. 2 illustrates that the reception completion indicator and the reception standby indicator occupy separate bit regions, but both the reception completion indicator and the reception standby indicator may also be displayed in one bit region. For example, the case where the reception of the data frame is normally completed may be indicated as 1, and the case where the data frame is being received may be indicated as 0.

Operation S120 may include, more particularly, operations S121 to S123, and in operation S121, it is determined whether the reception completion indicator for the second data frame having the same identification information as the identification information of the first data frame exists in the redundancy check table.

Herein, the case where the reception completion indicator for the second data frame exists means that the same information as that of the first data frame has been already received, so that information of the remaining region is not received and the first data frame is deleted in order to prevent the redundant reception of the data frame (S122).

In contrast to this, the case where the reception completion indicator for the second data frame does not exist means that the data frame having the same identification information as that of the first data frame has not been received, so that entire data of the first data frame is received (S123). Further, in the case where the reception completion indicator for the second data frame does not exist but the reception standby indicator exists, it cannot be determined whether entire data of the second data frame is to be normally received at a current time, so that the first data frame may be temporarily stored. Then, all of the entire data of the first data frame may be received and temporarily stored completely, and then it may be checked whether the reception completion indicator for the second data frame exists in the redundancy check table again.

Further, as another exemplary embodiment, when the reception standby indicator for the second data frame exists, the reception of the first data frame may be postponed for a predetermined time, and then whether the reception completion indicator for the second data frame exists may be checked again after the predetermined time elapses. After the check, operations S121 to S123 may be performed. Herein, the predetermined time may be set within a maximum time range taken for receiving the entire data of a single data frame, and for example, the predetermined time may be set with an average value of time taken for completion of the reception of the entire data of one data frame.

Figure 3:
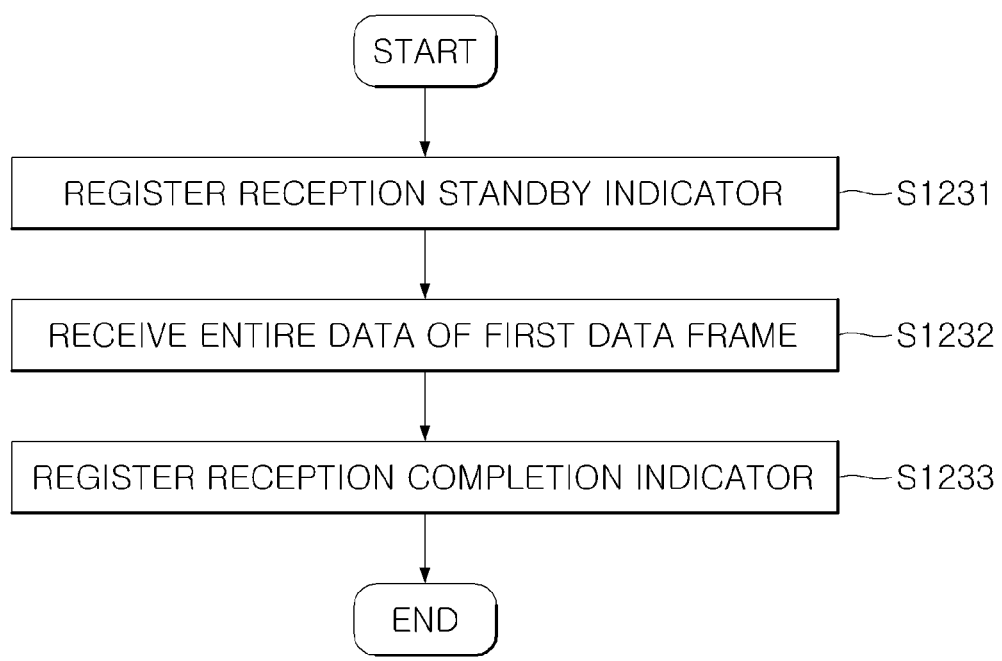
FIG. 3 is a diagram illustrating a process of registration in a redundancy check table in the method of removing data frame redundancy according to the present invention.

FIG. 3 is a diagram illustrating a process of registration in the redundancy check table in the method of removing data frame redundancy according to the present invention.

When it is determined that there is no history indicating that the data frame having the same identification information as that of the first data frame is normally received completely in operation S121 of FIG. 1, the entire data of the first data frame may be received and simultaneously, a history of the reception of the first data frame may be formed in the redundancy check table in operations S1231 and S1232 of FIG. 3.

First, in operation S1231, the reception standby indicator is registered before the entire data of the first data frame is completely received, so that it is possible to prevent a separate data frame having the same identification information from being received at the same time during the reception of the first data frame.

In operation S1232, the entire data of the first data frame may be received. Operation S1232 may also be simultaneously performed with operation S1231.

In operation S1233, when the entire data of the first data frame is completely received, the preferentially registered reception standby indicator may be changed to the reception completion indicator, or the reception standby indicator may be removed and the reception completion indicator may be registered. Even though a partial region of a separate data frame having the same identification information as that of the first data frame is received after the reception completion indicator for the first data frame is registered, the entire remaining data of the corresponding separate data frame is not received and is removed (see operations S121 and S122).

Mode for Carrying Out the Invention

Figure 4:
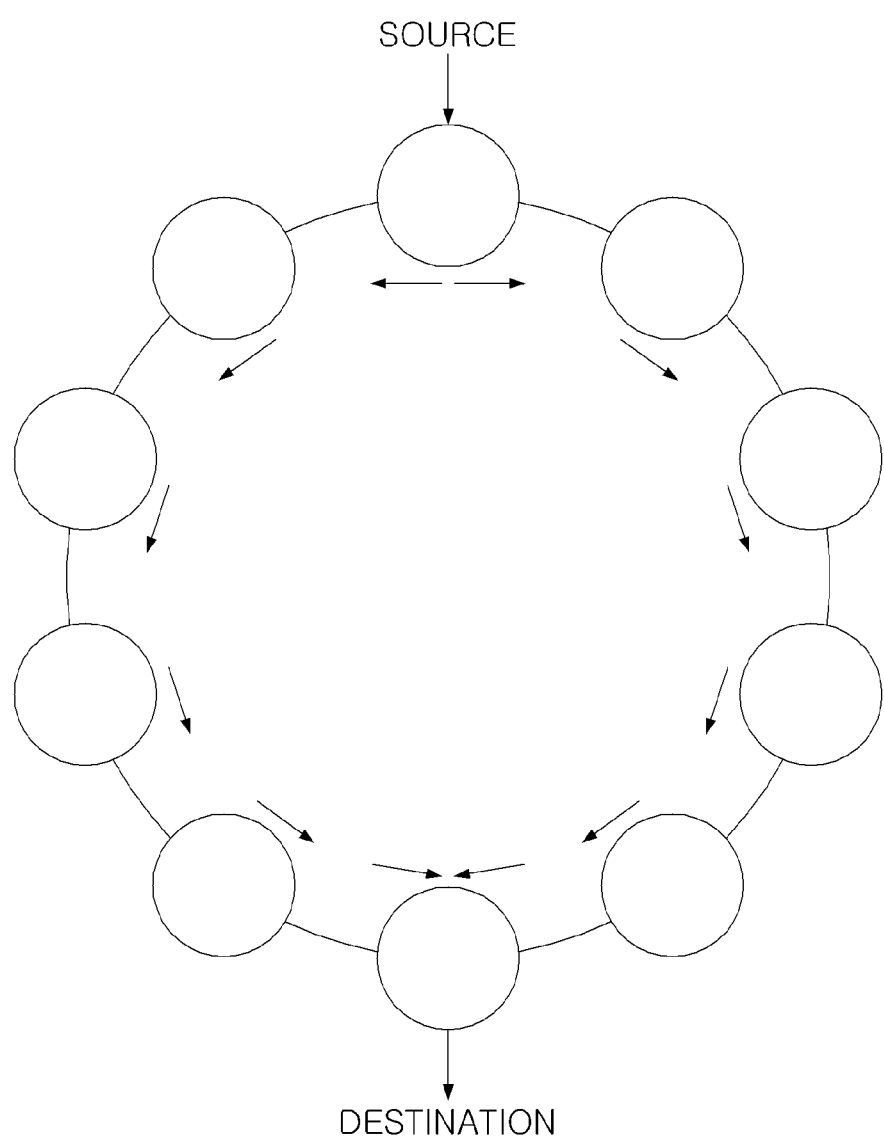
FIG. 4 is a diagram illustrating a network environment having a ring structure as an example for describing the method of removing data frame redundancy according to the present invention.

FIG. 4 is a diagram illustrating a network environment having a ring structure as an example for describing the method of removing data frame redundancy according to the present invention.

For example, as a result of the check of the redundancy check table because a data frame enters in a counterclockwise direction, when there is a history indicating that a data frame having the same source address and the same sequence number enters first in a clockwise direction and are normally received completely, the data frame entering in the counterclockwise direction is deleted (see operations S121 and S122). Further, the data frame is not transferred to an adjacent node at an opposite side. The reason is that the adjacent node of the opposite side has already received the data frame entering in the clockwise direction.

As another example, a result of the check of the redundancy check table because a data frame enters in the counterclockwise direction, when a data frame having the same source address and the same sequence number is being currently received, that is, the data frame is received first in the clockwise direction, so that when there exists the reception standby indicator, the data frame received in the counterclockwise direction may not be immediately removed, and may be temporarily stored. In this case, when all of the data frames in the counterclockwise direction are received thereafter, whether the data frame received in the clockwise direction is completely received may be checked in the redundancy check table again to determine whether to remove redundancy.

Figure 5:
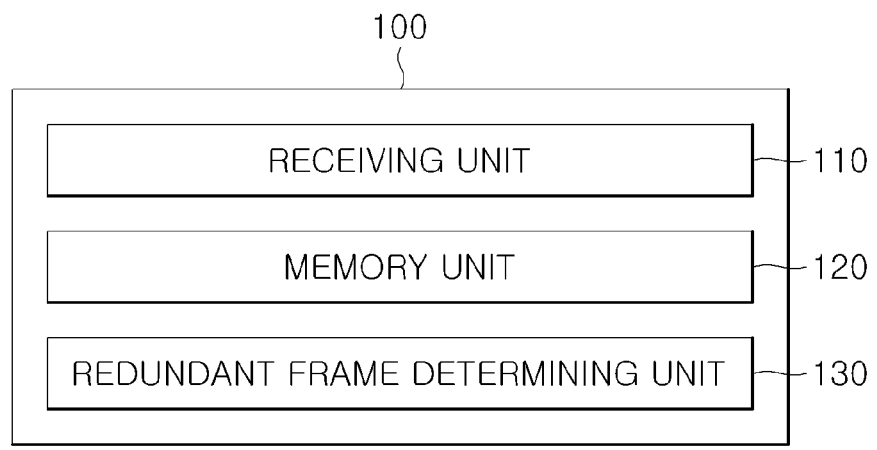
FIG. 5 is a diagram illustrating a device for removing data frame redundancy according to the present invention.

FIG. 5 is a diagram illustrating a device for removing data frame redundancy according to the present invention.

Referring to FIG. 5, a device 100 for removing data frame redundancy according to the present invention may include a receiving unit 100, a memory unit 200, and a redundant frame determining unit 300. The device 100 for removing data frame redundancy may also be a device physically divided from each node, and may also simply mean a functional configuration.

The receiving unit 100 may receive a data frame from an adjacent node.

The memory unit 200 stores a redundancy check table storing a data frame reception history in order to prevent a data frame from being redundantly received. The redundancy check table may be continuously updated according to a received data frame.

The redundant frame determining unit 300 may determine whether there exists a reception completion indicator for a data frame having the same identification information as that of the received data frame based on the redundancy check table, and when the reception completion indicator exists, the received data frame may be deleted.

In the meantime, the foregoing exemplary embodiments of the present invention may be written as a computer executable program, and the written program may be stored in a medium.

The medium may include a storage medium, such as a magnetic storage medium (for example, a ROM, a floppy disk, and a hard disk), an optical reader medium (for example, a CD-ROM and a DVD), and carrier wave (for example, transmission through the Internet), but is not limited thereto.

Although the exemplary embodiment of the present invention has been described for illustrative purposes, those skilled in the art will appreciate that various modifications, additions and substitutions are possible, without departing from the scope and spirit of the invention as disclosed in the accompanying claims. Therefore, the exemplary embodiment disclosed in the present invention is intended to illustrate the scope of the technical idea of the present invention, not to limit the technical spirit of the present invention, and the scope of the present invention is not limited by the exemplary embodiment. The scope of the present invention shall be construed on the basis of the accompanying claims in such a manner that all of the technical ideas included within the scope equivalent to the claims belong to the present invention.

The invention claimed is:

1. A method of removing data frame redundancy, the method comprising:
   receiving a first data frame from an adjacent node; and
   determining that the first data frame is a redundant frame of a second data frame based on a predetermined redundancy check table that includes a reception completion indicator for the second data frame having the same identification information as identification information of the first data frame, and deleting the first data frame according to a result of the determination, the second data frame having been received before receiving the first data frame,
   wherein the method further includes:
   temporarily storing the first data frame based on the predetermined redundancy check table that includes a reception standby indicator rather than the reception completion indicator, the reception standby indicator indicating that the first data frame is being received; and
   checking the predetermined redundancy check table for including the reception completion indicator after a predetermined time elapses from temporarily storing the first data frame.

2. The method of claim 1, further comprising receiving entire data of the first data frame based on the predetermined redundancy check table that does not include the reception completion indicator for the second data frame.

3. The method of claim 2, further comprising:
   registering the identification information of the first data frame and the reception standby indicator indicating that the first data frame is being received in the redundancy check table; and
   changing the reception standby indicator indicating that the first data frame is being received to the reception completion indicator after receiving the entire data of the first data frame.

4. The method of claim 1, wherein the identification information includes a source address and a sequence number.

5. The method of claim 1, wherein the first data frame is transferred by a cut-through scheme.

6. A non-transitory computer-readable medium for storing a computer program that executes a method of removing data frame redundancy, the method comprising:
   receiving a first data frame from an adjacent node;
   determining that the first data frame is a redundant frame of a second data frame based on a predetermined redundancy check table that includes a reception completion indicator for the second data frame having the same identification information as identification information of the first data frame, and deleting the first data frame according to a result of the determination, the second data frame having been received before receiving the first data frame;
   temporarily storing the first data frame based on the predetermined redundancy check table that includes a reception standby indicator rather than the reception completion indicator, the reception standby indicator indicating that the first data frame is being received; and
   checking the predetermined redundancy check table for including the reception completion indicator after a predetermined time elapses from temporarily storing the first data frame.

7. A device for removing data frame redundancy, the device comprising:
   a receiver configured to receive a first data frame from an adjacent node;
   a memory configured to store a redundancy check table including identification information of a received data frame and a reception completion indicator for the received data frame; and
   a redundant frame determinator configured to determine that the first data frame is a redundant frame of a second data frame based on the redundancy check table that includes a reception completion indicator for the second data frame having the same identification information as identification information of the first data frame, the second data frame having been received by the receiver before receiving the first data frame, and delete the first data frame according to a result of the determination,
   wherein the redundant frame determinator is further configured to:
   temporarily storing the first data frame based on the redundancy check table that includes a reception standby indicator rather than the reception completion indicator, the reception standby indicator indicating that the first data frame is being received; and
   checking the redundancy check table for including the reception completion indicator after a predetermined time elapses from temporarily storing the first data frame.

* * * * *